US007967909B2

(12) United States Patent
Lopez et al.

(10) Patent No.: US 7,967,909 B2
(45) Date of Patent: Jun. 28, 2011

(54) METHOD OF CEMENTING WITHIN A GAS OR OIL WELL

(75) Inventors: Enrique Lopez, Midland, TX (US); Dean P. Olson, Midland, TX (US); Wayman Hunter, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 885 days.

(21) Appl. No.: 11/711,574

(22) Filed: Feb. 26, 2007

(65) Prior Publication Data

US 2008/0202752 A1    Aug. 28, 2008

(51) Int. Cl.
C04B 14/10    (2006.01)
(52) U.S. Cl. ................. 106/718; 106/737; 166/292
(58) Field of Classification Search .......... 106/718, 106/737
See application file for complete search history.

(56) References Cited

U.S. PATENT DOCUMENTS

| | | | |
|---|---|---|---|
| 4,377,415 A | 3/1983 | Johnson et al. | |
| 4,452,635 A | 6/1984 | Noshi et al. | |
| 4,642,137 A * | 2/1987 | Heitzmann et al. | 106/607 |
| 5,105,885 A | 4/1992 | Bray et al. | |
| 5,226,961 A | 7/1993 | Nahm et al. | |
| 5,342,445 A | 8/1994 | Kiyomoto et al. | |
| 5,421,409 A | 6/1995 | Mueller et al. | |
| 5,447,197 A | 9/1995 | Rae et al. | |
| 5,494,513 A | 2/1996 | Fu et al. | |
| 5,531,824 A | 7/1996 | Burkes et al. | |
| 5,547,024 A | 8/1996 | Di Lullo Arias | |
| 5,613,558 A | 3/1997 | Dillenbeck, III | |
| 5,900,053 A | 5/1999 | Brothers et al. | |
| 6,145,591 A | 11/2000 | Boncan et al. | |
| 6,173,778 B1 | 1/2001 | Rae et al. | |
| 6,230,804 B1 | 5/2001 | Mueller et al. | |
| 6,235,809 B1 | 5/2001 | Di Lullo Arias et al. | |
| 6,521,004 B1 | 2/2003 | Culler et al. | |
| 6,620,214 B2 | 9/2003 | McArdle et al. | |
| 6,626,243 B1 | 9/2003 | Go Boncan | |
| 6,626,991 B1 | 9/2003 | Drochon et al. | |
| 6,729,405 B2 | 5/2004 | Di Lullo et al. | |
| 6,832,652 B1 | 12/2004 | Dillenbeck et al. | |
| 6,907,928 B2 | 6/2005 | Di Lullo Arias et al. | |
| 6,964,302 B2 | 11/2005 | Luke et al. | |
| 6,989,057 B2 | 1/2006 | Getzalf et al. | |
| 7,048,053 B2 | 5/2006 | Santra et al. | |
| 7,137,448 B2 | 11/2006 | Di Lullo Arias et al. | |
| 7,156,173 B2 | 1/2007 | Mueller | |
| 7,459,019 B2 | 12/2008 | Barlet-Gouedard et al. | |

(Continued)

FOREIGN PATENT DOCUMENTS

GB    2353523 B    3/2004

*Primary Examiner* — Paul Marcantoni
(74) *Attorney, Agent, or Firm* — John Wilson Jones; Jones & Smith, LLP

(57) ABSTRACT

A cement mix for cementing the well casing within a wellbore which contains a synergistic blend of an alkali metasilicate and/or alkali silicate, aluminum silicate and either silica fume or micro silica quartz along with a Portland cement. The cement mix, when combined with mix water, may render a cementitious slurry having a density less than or equal to 11.5 pounds per gallon (ppg); the amount of mix water in the cementitious slurry being between from about 200 to about 560 percent by weight of cement (BWOC). The compressive strength of such cementitious slurries, when cured, is in excess of 100 psi, more typically in excess of 200 psi, after 72 hours at 130° F.

31 Claims, 4 Drawing Sheets

U.S. PATENT DOCUMENTS

| | | |
|---|---|---|
| 2004/0108113 A1 | 6/2004 | Luke et al. |
| 2004/0188091 A1 | 9/2004 | Luke et al. |
| 2004/0244977 A1 | 12/2004 | Luke et al. |
| 2005/0000734 A1 | 1/2005 | Getzalf et al. |
| 2005/0072599 A1 | 4/2005 | Luke et al. |
| 2005/0204962 A1 | 9/2005 | Luke et al. |
| 2006/0054319 A1 | 3/2006 | Fyten et al. |
| 2006/0108150 A1 | 5/2006 | Luke et al. |
| 2006/0137876 A1 | 6/2006 | Santra et al. |
| 2006/0148657 A1 | 7/2006 | Santra et al. |
| 2008/0066652 A1 | 3/2008 | Fraser et al. |
| 2008/0066654 A1* | 3/2008 | Fraser .................. 106/709 |
| 2008/0066655 A1* | 3/2008 | Fraser .................. 106/709 |
| 2008/0115938 A1 | 5/2008 | Bray |

* cited by examiner

METHOD OF CEMENTING WITHIN A GAS OR OIL WELL

FIELD OF THE INVENTION

This invention relates to cement mixes and low density cementitious slurries prepared therefrom which are useful for oil and gas well cementing, as well as to a method of cementing an oil or gas well using such slurries.

BACKGROUND OF THE INVENTION

During construction of oil and gas wells, a rotary drill is typically used to bore through subterranean formations of the earth to form a borehole. As the rotary drill bores through the earth, a drilling fluid, known in the industry as a "mud," is circulated through the borehole. Drilling fluids are usually pumped from the surface through the interior of the drill pipe. By continuously pumping the drilling fluid through the drill pipe, the drilling fluid can be circulated out the bottom of the drill pipe and back up to the well surface through the annular space between the wall of the well bore and the drill pipe.

Once the wellbore has been drilled, casing is lowered into the wellbore. A cement slurry is then pumped into the casing and a plug of fluid, such as drilling mud or water, is then pumped behind the cement slurry in order to force the cement up into the annulus between the exterior of the casing and the borehole. The cement slurry is then allowed to set and harden to hold the casing in place.

Successful cementing of the well pipe and casing during oil and gas well completion requires the cement slurry to be characterized by several important properties. For instance, the cement slurry must have a pumpable viscosity, fluid loss control, minimized settling of particles and the ability to set within a practical time.

Under normal conditions, hydraulic cements, such as Portland cement, quickly develop compressive strength upon introduction to a subterranean formation, typically within 48 hours from introduction. As time progresses, the cement develops greater strength while hydration continues. It is sometimes necessary to use a lightweight cement when there is a weak subterranean formation. A lightweight cement exerts a lower hydrostatic pressure on the formation than do regular cements.

When used, lightweight cements should exhibit a low density without sacrificing strength. Density can be lowered in such cements by mixing a lightweight additive, such as sealed microballoons, with the cement. U.S. Pat. No. 6,832,652 discloses the use of glass or ceramic microspheres, such as borasilicate glass, to render a cement of low density, typically ranging from about 13.0 pounds per gallon (ppg) to about 6.0 ppg or less. In some applications, the use of such lightweight additives is economically unfeasible or is procedurally cumbersome.

Lightweight cements may also be created by injecting the cement with a gas, such as nitrogen, in order to create a foam. This foaming operation can be difficult because additional nitrogen equipment is required and the addition of gas must occur on-site which requires that the density of the slurry be carefully measured before use.

Alternatives have therefore been sought for lightweight cements which render the requisite compressive strength and yet are not foams and do not require lightweight cement additives.

SUMMARY OF THE INVENTION

The cement mix of the invention, when formulated into a hydraulically-active, cementitious slurry, is suitable for cementing within a subterranean formation for wells, including oil wells, gas wells, water wells, injection wells, disposal wells and storage wells. In a preferred embodiment, slurries containing the cement mix are used to cement the well casing within the wellbore.

In addition to containing hydraulically-active cementitious material, the cement mix defined herein contains an alkali metasilicate and/or alkali silicate, aluminum silicate and either silica fume or micro silica quartz. The combination of alkali metasilicate and/or alkali silicate, aluminum silicate and silica fume or micro silica quartz creates a synergy such that, when added to a hydraulically-active cementitious material, a lightweight slurry is created having a compressive strength sufficient for cementing the well casing within the wellbore.

In particular, alkali metasilicate and/or alkali silicate, calcined kaolin or metakaolin and silica fume or micro silica quartz, when combined with a hydraulically-active cementitious material, is capable or producing a cementitious slurry having a density less than or equal to 11.5 pounds per gallon (ppg). The cementitious slurries defined herein most typically have a density in the range between from about 9.5 to about 11.5 ppg.

Further, the synergy evidenced by the combination of alkali metasilicate and/or alkali silicate, calcined kaolin or metakaolin and silica fume or micro silica quartz permits the production of a slurry having mix water in an amount between from about 200 to about 560 percent by weight of cement (BWOC). The compressive strength of such cementitious slurries, when cured, is in excess of 100 psi after 24 hours at 130° F. Thus, the cementitious slurry exhibits a high compressive strength, upon curing, especially when considered in light of the large volume of mix water which may be used to create the slurry.

Typically, the cement mix contains between from about 0.1 to about 8 percent BWOC of an alkali metasilicate and/or alkali silicate; from about 2 to about 10 percent BWOC of calcined kaolin or metakaolin; and between from about 0.5 to about 55 percent BWOC of silica fume or micro silica quartz.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

Figure 1:
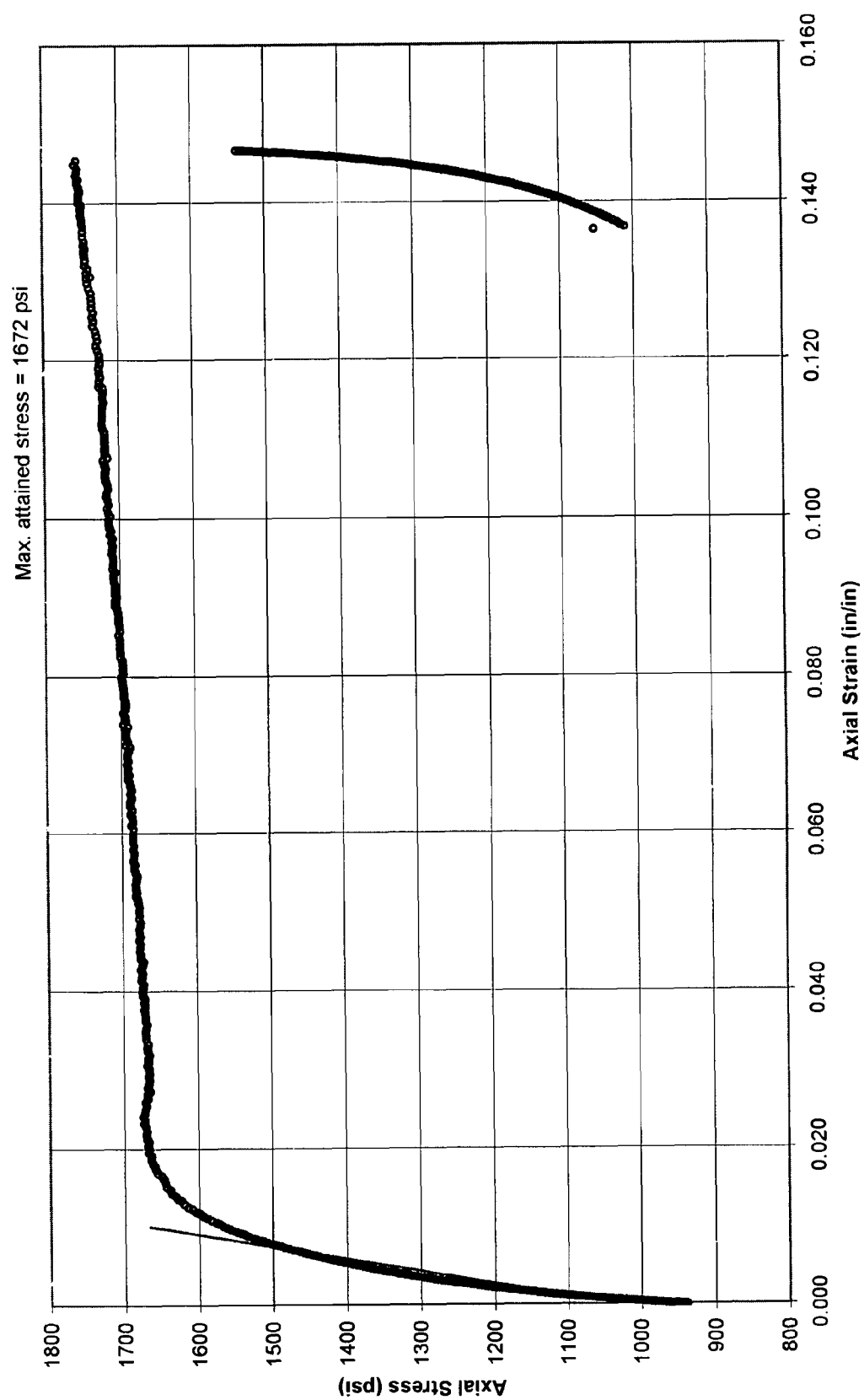
FIGS. 1, 2, 3 and 4 represent the stress/strain curves for the cements illustrated in Examples 13, 14, 15 and 16, respectively.

In cementing the well bore of an oil or gas well, a pumpable slurry is formed from the combination of mix water and a cement mix of a hydraulically-active cementitious material and the combination of alkali metasilicate and/or alkali silicate, an aluminum silicate, such as kaolin or metakaolin, and either silica fume or micro silica quartz. The combination of alkali metasilicate and/or alkali silicate, calcined kaolin or metakaolin and silica fume or micro silica quartz in the cement mix imparts certain synergistic effects to the cementitious slurry.

First, the presence of such materials in the cement mix permits the creation of a lightweight cementitious slurry having a density less than or equal to 11.5 pounds per gallon (ppg). In a preferred embodiment, cementitious slurries prepared from the cement mix and mix typically have a density in the range between from about 9.5 to about 11.5 ppg. During operation, the reduced slurry density reduces the hydrostatic pressure on the cement column. This enables weak zones to be successfully cemented and isolated.

Second, the lightweight cementitious slurries defined herein are much more inexpensive to produce since they do not require the use of lightweight additives, such as microspheres, to render the requisite low density. Neither do such slurries require the presence of a foaming agent or gas. In a preferred embodiment, the cementitious slurries defined herein contain no additive greater than about 0.01 percent by weight of cement (BWOC) with an apparent specific gravity less than 1.0. The cementitious slurries may be used without restrictions on hydrostatic pressure since pressure sensitive lightweight additives, such as glass spheres, are unnecessary.

Fourth, the compressive strength exhibited by such cementitious slurries, when cured, is in excess of 100 psi after 24 hours at 130° F. More typically, the compressive strength is in excess of 100 psi after 72 hours at 130° F., typically in excess of 200 psi or 250 psi and may be 350 psi or higher after 72 hours at 130° F. Such compressive strengths are attainable at high mix water:cement mix ratios.

Typically, the amount of mix water in the cementitious slurries is high, between from about 200 to about 560 percent BWOC. In light of the high mix water ratio, the slurry yield, expressed in cubic feet of slurry per sack of cement (cuft/sk), is increased. The increased slurry yield reduces the cost per volume of cement slurry. The slurry yield, in light of the high mix water ratio, is typically greater than 3.5 cuft/sk, is often between 4 to 6 cuft/sk and may be as high as 16 cuft/sk.

The mix water is typically fresh water. The mixing water is utilized with the dry cement and synergistic components to produce a fluid pumpable slurry of suitable consistency. API Spec 10A, (22nd ed., January 1995 or alternatively ISO 10426-1), which is known in the cement industry, describes an approved apparatus and method for measuring the consistency of cement slurries in terms of Bearden units of consistency (Bc). A pumpable slurry should measure in the range from about 2-20 Bc and preferably be in the range from about 5 to II Bc. Slurries thinner than about 5 Bc will tend to have greater particle settling and free water generation. Slurries thicker than about 20 Bc become increasingly difficult to mix and pump.

Any of the oil well type cements of the class "A-H" as listed in the API Spec 10A, (22nd ed., January 1995 or alternatively ISO 10426-1), are suitable. Especially preferred is Portland cement, preferably an API Class A, C, G or H cement. Most preferred, are Class C and H Portland cements. Class C cement is typically used for shallower to moderate wells whereas Class H Portland cement is typically used for moderate to deep well applications.

Such cements may further be admixed with aluminous cements, pozzolan cements, fly ash cements, and the like. When used, no more than about 45 weight percent of the cement would contain such aluminous cements, pozzolan cements, fly ash cements, etc. Such materials are typically used to decrease the requisite amount of Portland cement.

The aluminum silicate is typically comprised of $SiO_2/Al_2O_3/Fe_2O_3$. Most typically the aluminum silicate is kaolin, calcined kaolin or kaolinite (metakaolin) or mixtures thereof. Such aluminum silicate may also be referred to as China Clay. Other suitable forms of aluminum silicate include, but are not limited to, halloysite, dickite, and nacrite, and mixtures thereof, as well as mixtures of these with materials with kaolin and/or metakaolin. The amount of aluminum silicate in the cement mix is typically between from about 2 to about 10 weight percent, preferably from about 3 to about 5 weight percent.

The alkali metasilicate and/or alkali silicate is preferably sodium metasilicate or sodium silicate. The cement mix typically contains between from about 0.1 to about 8.0, preferably between from about 3.0 to about 6.0, weight percent of alkali metasilicate and/or alkali silicate. A preferred sodium metasilicate for use in this invention is commercially available from BJ Services Company as A-2, SMS or EXC.

The silica fume may be compacted. In contrast to the amorphous nature of silica fume, the micro silica quartz is crystalline and is therefore fundamentally different in form. The mean particle diameter of the silica fume and micro silica quartz is 34 μm and 14 μm, respectively. The silica fume and micro silica quartz is typically in the cement mix in an amount between from about between from about 0.5 to about 55 percent BWOC, preferably less than about 50 percent BWOC, more preferably less than or equal to 30 percent BWOC.

In a particularly preferred embodiment, the silica fume is used in combination with a Class H cement and the micro silica quartz is used in combination with a Class C cement.

In another preferred embodiment of the invention, the micro silica quartz is used in combination with one or more components selected from aluminum oxide, iron oxide, calcium oxide and calcium sulfate. Exemplary for use as the micro silica quartz is crystalline silica as well as a blend of crystalline silica quartz and one or more of aluminum oxide, iron oxide, calcium oxide and calcium sulfate.

It may be desirable that the cement mix contain a set retarder in order to delay the set time of the cementitious slurry. Such set retarders are particularly useful when the cementitious slurry is exposed to high subterranean temperatures. In addition to being capable of delaying the set time of the cement composition, the set retarder also functions to extend the time the cementitious slurry remains pumpable after the cementitious slurry is mixed and before it is placed into the desired location. When present, the set retarder may be present in an amount between from about 0.1 to about 5 percent BWOC.

Suitable set retarders include glucoheptonates, such as sodium glucoheptonate, calcium glucoheptonate and magnesium glucoheptonate; lignin sulfonates, such as sodium lignosulfonate and calcium sodium lignosulfonate; gluconic acids gluconates, such as sodium gluconate, calcium gluconate and calcium sodium gluconate; phosphonates, such as the sodium salt of EDTA phosphonic acid; sugars, such as sucrose; hydroxycarboxylic acids, such as citric acid; and the like, as well as their blends. Sodium lignosulfonate is especially preferred.

The cement mix of the invention may further contain an additive to prevent the loss of the cement to the formations. Any lost circulation additive known in the art may be used. Such additives include naturally occurring solid hydrocarbons, like asphaltenes, such as LCM-1, a product of BJ Services Company; shredded cellophane film such as Cello-Flake, a product of BJ Services Company; and fibrous, granular and flake materials, such as Kwik Seal, also a product of BJ Services Company. When present, such additives may be present in an amount between from about 0.5 to about 30 weight BWOC.

The cement mix further contain a fluid loss control. Suitable fluid loss control additives include polyvinyl alcohol, hydroxyethyl cellulose, carboxymethyl hydroxyethyl cellulose, synthetic anionic polymers and synthetic cationic polymers. Such fluid loss control additives are typically dry blended to the cement mix. The amount of fluid loss control additive in the cementitious slurry, when employed, is between from about 0.1 to about 5.0 percent BWOC.

The cementitious slurry of the invention may further contain conventional additives used in the cementing of a gas or oil wellbore such as suspending or thixotropic agents (like welan gum, xanthan gum, cellulose and derivatives such as carboxymethyl-hydroxyethyl-cellulose, guar and its derivatives), cement dispersants (like polyacrylates and naphtalene sulfonic acids), agents for thickening of the gel strength of the slurry (like gypsum), as well as strength retrogression additives, anti-settling agents, permeability reducers, cement bonding agents, free fluid control agents, etc.

Cementitious slurries composed of the cement mix and large amount of mix water are very suitable for cementing within a subterranean formation for wells, including oil wells, gas wells, water wells, injection wells, disposal wells and storage wells. The low density cementitious slurries have been seen to exhibit very low permeability to air (generally less than 0.001%), a high Poisson ratio, a relatively low Young's modulus index and high tensile strength to compressive strength ratio. As such, the slurries are especially useful in cementing of well casings within the wellbore.

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

EXAMPLES

Examples 1-12

A cement mix was prepared by blending a combination of the following components:

Class H and Class C, API Portland cement;

CSE-2, crystalline silica quartz, aluminum oxide, iron oxide, calcium oxide and calcium sulfate, a product of BJ Services Company;

MPA-1, an aluminum silicate, a product of BJ Services Company;

SMS refers to sodium metasilicate, a product of BJ Services Company;

LCM-1 refers to a naturally occurring solid hydrocarbon, a product of BJ Services Company;

R-21 refers to sodium lignosulfonate, a set retarder and a product of BJ Services Company;

BA-90, compacted, amorphous silica fume, a product of BJ Services Company;

FL-52A, hydroxyethyl cellulose, a fluid loss additive for cement slurries and a product of BJ Services Company;

A-10, calcium sulfate hemi-hydrate, a product of BJ Services Company;

ASA-301, a free fluid control agent, a product of BJ Services Company;

The abbreviations used in the tables have the following meanings:

a mixture of components for a cement mix, such as 47:20:17 Class H:Poz (fly ash):CSE-2, in Example 1, refers to a blend containing 47 lbs Class H cement, 20 lbs pozaolean cement and 17 pounds of CSE-2 per sack;

cement BWOC, refers to by weight of cement; and percentages refer to weight percentages of a component in the cement mix.

A sufficient amount of fresh water was then added to the cement mix to reach a density of 10.5 pounds per gallon (ppg) (1200 kg/m$^3$). The percent water is expressed as the percentage of water in the cementitious slurry which includes the cement mix. The resulting slurry was stirred for about 30 minutes to ensure homogeneity and dissolve any remaining lumps of dry material.

The rheology was then determined at 600, 300, 200, 100, 6 and 3 rpm on a rotational viscometer with an R1-B1 rotor-bob combination (API RP 10B-2/ISO 10426-2).

The compressive strength of the slurries was measured at 24 hours, 48 hours and 72 hours at 130° F. (54.4° C.).

The results of the tests are set forth in the table which follows wherein the Thickening Time, TTT, represents the amount of time (hrs:minutes) that the slurry remained in a liquid state, for instance the measurement "5:45/5:46" refers to the amount of time for the cement slurry to reach 70/100 Bc, wherein Bc is Bearden Consistency, BHCT is Bottom Hole Circulating Temperature and BHST is bottom hole static temperature. Thus, the TTT is indicative of the amount of time that the cement slurry remains pumpable at the stated temperature, BHCT and bottom hole pressure, BHP. BHCT and BHP was stimulated by a pressurized consistometer used for the testing of oil well cements. The consistometer placed the slurry under a constant shear and applied temperature and pressure from ambient to the BHCT and BHP per industry standards. The data generated is set in the following table wherein the yield of the slurry is expressed as the volume in cubic feet per sack of cement that is generated as a consequence of the cements, additives and mix water. The yield in cuft/sk is denoted as "YLD" in Table I below:

TABLE I

| Ex. No. | BHCT, (° F.) | BHST, ° F. | Depth, Ft | TTT, 70Bc | Slurry | % H$_2$O | YLD | 600 RPM | 300 RPM | 200 RPM | 100 RPM | 6 RPM | 3 RPM | Compressive Strength, psi @ 130° F. |
|---|---|---|---|---|---|---|---|---|---|---|---|---|---|---|
| 1 | 151 | 190 | 12800 | 4:00+ | 47:20:17 Class H:Poz (Fly Ash):CSE-2 4.00% MPA-1 4.00% SMS 5.95% BWOC LCM-1 1.00% R-21 | 219.50 | 3.577 | 20 | 12 | 10 | 7 | 4 | 3 | 12 hrs - 134; 24 hrs - 263; 48 hrs - 372; 72 hrs - 397; 120 hrs - 415 |
| 2 | 151 | 190 | 12800 | 4:00+ | 80:0:20 Class H:Poz (Fly Ash):CSE-2 4.00% MPA-1 4.00% SMS 1.50% R-21 5.56% BWOC LCM-1 | 230.30 | 4.390 | 24 | 14 | 11 | 9 | 4 | 3 | 12 hrs - 64; 24 hrs - 185; 48 hrs - 351 |

TABLE I-continued

| Ex. No. | BHCT, (° F.) | BHST, ° F. | Depth, Ft | TTT, 70Bc | Slurry | % H₂O | WGT | YLD | 600 RPM | 300 RPM | 200 RPM | 100 RPM | 6 RPM | 3 RPM | Compressive Strength, psi @ 130° F. |
|---|---|---|---|---|---|---|---|---|---|---|---|---|---|---|---|
| 3 | 151 | 190 | 12800 | 7:30 | Class H<br>21.3 BWOC BA-90<br>4.00% MPA-1<br>1.50% FL-52A<br>3.00% SMS<br>0.30% ASA-301<br>1.00% R-21<br>5.3% BWOC LCM-1 | 276.10 | | 4.937 | 68 | 44 | 35 | 25 | 15 | 13 | 12 hrs - 99;<br>24 hrs - 304;<br>48 hrs - 378;<br>72 hrs - 425 |
| 4 | 151 | 190 | 12800 | 6:00+ | Class H<br>21.3 BWOC CSE-2<br>4.00% MPA-1<br>1.50% FL-52A<br>3.50% SMS<br>0.50% ASA-301<br>1.00% R-21<br>5.3% BWOC LCM-1 | 279.40 | | 4.984 | 67 | 40 | 31 | 22 | 9 | 8 | 12 hrs - 27;<br>24 hrs - 71;<br>48 hrs - 172;<br>72 hrs - 227 |
| 5 | 151 | 190 | 12800 | 7:00+ | Class H<br>21.3 BWOC CSE-2<br>4.00% MPA-1<br>1.50% FL-52A<br>4.00% SMS<br>0.50% ASA-301<br>5.3% BWOC LCM-1 | 280.50 | | 4.991 | 48 | 30 | 22 | 14 | 4 | 3 | 12 hrs - 64;<br>24 hrs - 130;<br>72 hrs - 278 |
| 6 | 151 | 190 | 12800 | 8:00+ | Class H<br>21.3 BWOC CSE-2<br>4.00% MPA-1<br>1.50% FL-52A<br>5.00% SMS<br>1.00% ASA-301<br>5.3% BWOC LCM-1 | 283.00 | | 5.039 | 60 | 34 | 26 | 16 | 4 | 3 | 12 hrs - 93;<br>24 hrs - 188;<br>48 hrs - 299;<br>72 hrs - 351 |
| 7 | 151 | 190 | 12800 | | 61:33 Class H:Class C<br>21.3 BWOC CSE-2<br>4.00% MPA-1<br>1.50% FL-52A<br>4.00% SMS<br>0.50% ASA-301<br>5.3% BWOC LCM-1 | 280.50 | | 4.991 | 62 | 39 | 29 | 19 | 9 | 8 | 12 hrs - 37;<br>24 hrs - 129;<br>48 hrs - 243;<br>72 hrs - 303 |
| 8 | 151 | 190 | 12800 | | 61:33 Class H:Class C<br>10.6 BWOC CSE-2<br>1.50% FL-52A<br>5.00% SMS<br>0.50% ASA-301<br>5.3% BWOC LCM-1 | 255.90 | | 4.533 | 64 | 40 | 30 | 18 | 8 | 7 | 12 hrs - 90;<br>24 hrs - 134;<br>48 hrs - 201;<br>72 hrs - 236 |
| 9 | 147 | 185 | 12750 | 4:40 | Class C<br>16.00 BWOC CSE-2<br>4.00% MPA-1<br>1.00% BA-10<br>0.50% FL-52A<br>3.00% SMS<br>5.00% A-10<br>0.15% ASA-301<br>1.75% R-21<br>5.3% BWOC LCM-1 | 278.40 | | 4.968 | 30 | 17 | 13 | 8 | 5 | 4 | 12 hrs - 73;<br>24 hrs - 166;<br>48 hrs - 303;<br>72 hrs - 359 |
| 10 | 147 | 185 | 12750 | 5:10 | Class C<br>16.00 BWOC CSE-2<br>4.00% MPA-1<br>1.00% BA-10<br>0.50% FL-52A<br>3.00% SMS<br>5.00% A-10<br>0.15% ASA-301<br>2.00% R-21<br>5.3% BWOC LCM-1 | 278.30 | | 4.970 | 32 | 19 | 14 | 8 | 4 | 3 | 12 hrs - 95;<br>24 hrs - 164;<br>48 hrs - 281;<br>72 hrs - 326 |
| 11 | 147 | 185 | 12750 | 4:45 | Class H<br>21.3 BWOC CSE-2<br>4.00% MPA-1<br>0.50% FL-52A<br>1.00% BA-10<br>3.50% SMS<br>5.00% A-10<br>0.15% ASA-301<br>2.00% R-21<br>5.3% BWOC LCM-1 | 288.50 | 10.50 | 5.160 | 31 | 16 | 12 | 8 | 4 | 3 | 12 hrs - 50;<br>24 hrs - 125;<br>48 hrs - 245;<br>72 hrs - 296 |

TABLE I-continued

| 12 | 147 | 185 | 12750 | 4:15 | Class C<br>21.3 BWOC CSE-2<br>4.00% MPA-1<br>4.00% SMS<br>5.00% A-10<br>0.50% FL-52A<br>1.00% BA-10<br>0.15% ASA-301<br>2.50% R-21<br>5.3% BWOC LCM-1 | 289.10 | 10.50 | 5.180 | 34 | 20 | 15 | 11 | 7 | 6 | 12 hrs - 75;<br>24 hrs - 177;<br>48 hrs - 294;<br>72 hrs - 348 |

The Examples demonstrate that superior compressive strength is attained at high water mix ratios. Highly desirable results are especially attained when compacted silica is used in combination with Class H type cement (Example 1) and when Class C type cement is used in combination with micro silica quartz (Examples 11 and 12).

Examples 13-16

A cement mix was prepared by blending a combination of Class H API Portland cement, CSE-2, MPA-1, SMS, LCM-1, R-21, BA-90, FL-52A, ASA-301 and/or ground FORMICA®, a product of the Formica Corporation, as lost circulation additive ("LCA"). The ingredients of the cement mix are listed in Table II wherein the percentages of the other components are expressed in terms of weight percent in the cement mix. A sufficient amount of fresh water was then added to the cement mix to reach a density of 10.8 ppg (1294 kg/m$^3$). The percent water is expressed in terms of gallons per sack (gps). The resulting slurry was stirred for about 30 minutes.

The compressive strength of the cement was measured at 8, 12, 24, 48 and 72 hours, the maximum shear stress ard Young's modulus were measured by applying a confining force of about 1,000 psi (three times compressive strength) and the ability of the fluid or gas to penetrate the cement was measured with a Frank Jones permeameter standard test procedures. The results are shown in Table II where the first data point for compressive strength of "5:38:00" in Example 13 refers to the fact that the cement exhibited a compressive strength of 50 psi after 5 hours and 38 minutes:

The Young's modulus shown in Table II indicates acceptable elasticity of the cement against mechanical failure caused by stress cycling and the maximum shear stress demonstrates the ability of the cement to sustain high deformation without losing load bearing capacity under stress cycling. The low permeability index illustrates that the cementitious material would exhibit very low permeability to water or invading fluids. The stress level set forth by the low Young'modulus, maximum shear stress index and the high Poisson's ratio indicate that the low density cementitious material of the invention are especially useful in commercial applications.

Figure 2:
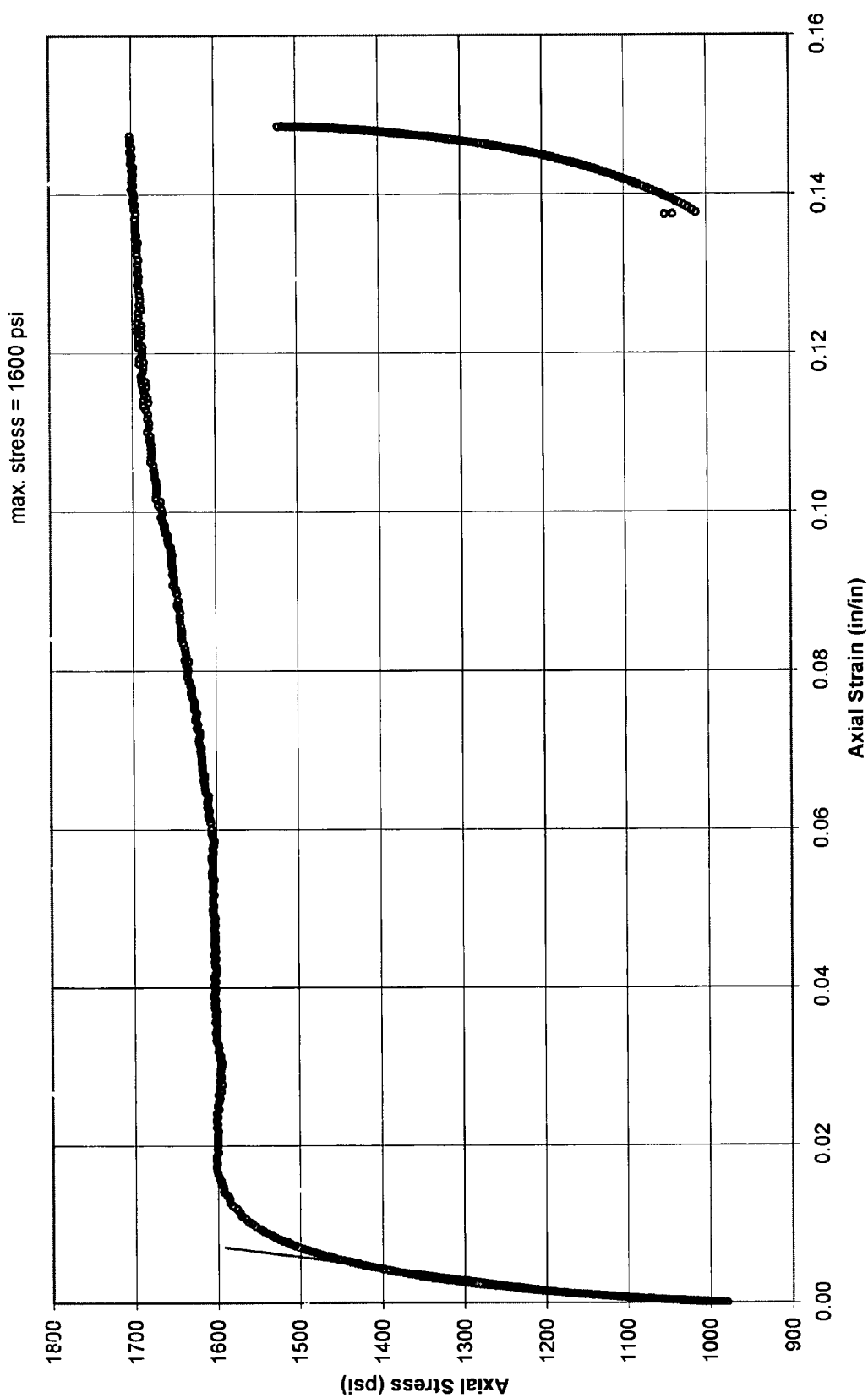
Figure 3:
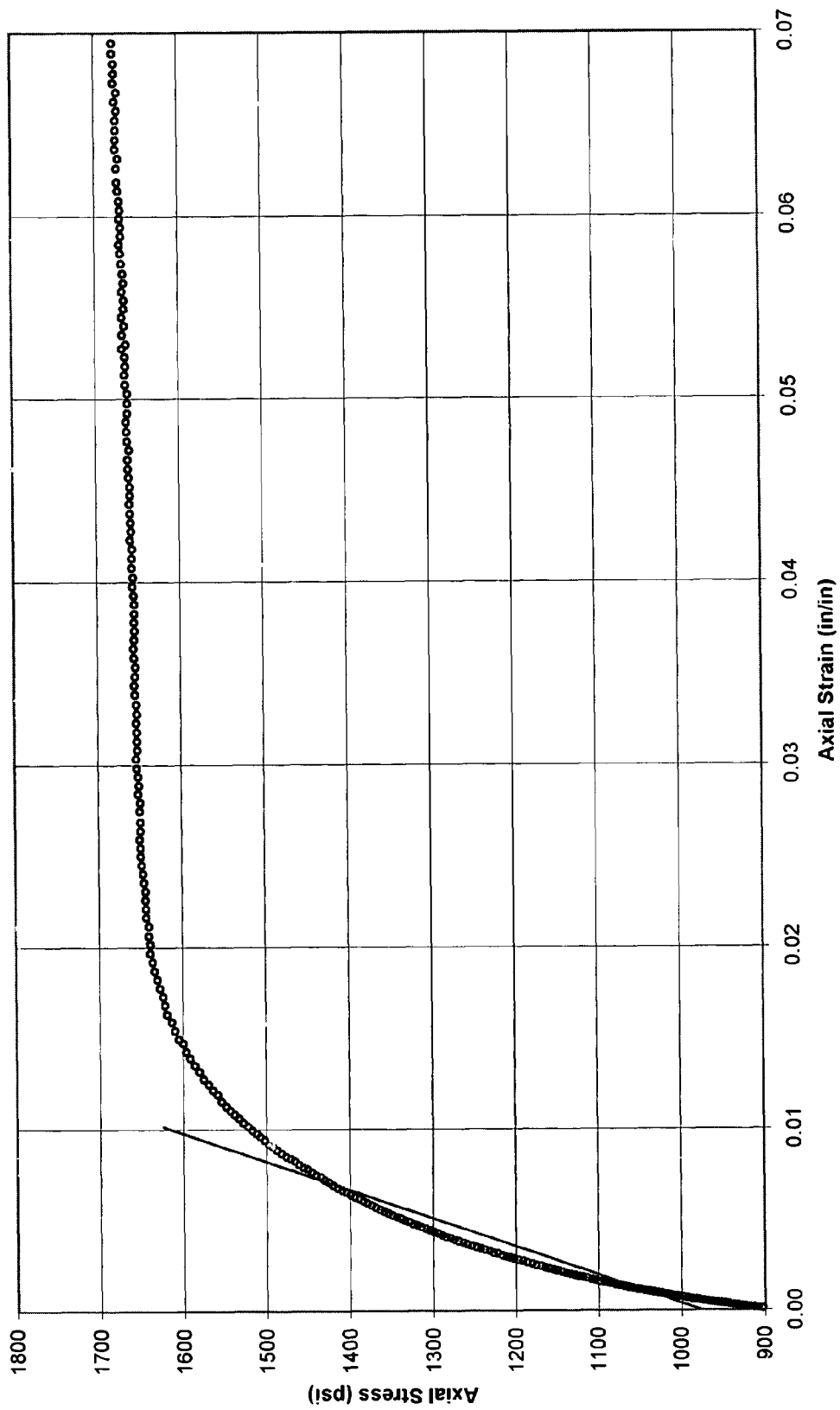
Figure 4:
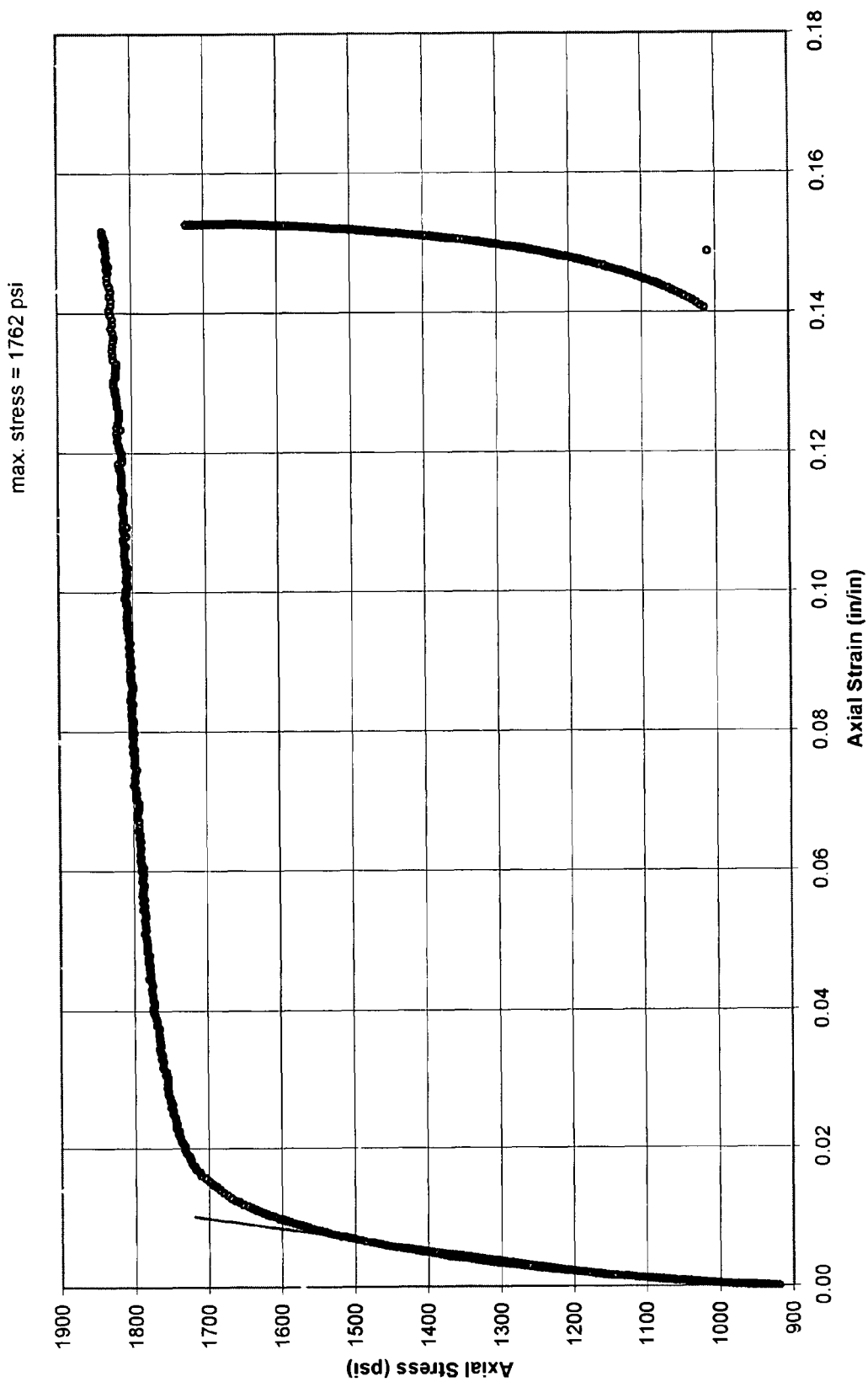

Further, the stress/strain curves for each of Examples 13, 14, 15 and 16 are set forth in FIGS. 1, 2, 3 and 4, respectively. FIGS. 1-4 demonstrate the large axial deformations that are achieved using the cement formulations of the examples while maintaining shear stress. Thus, the cement formulations of the invention display the ability to plastically deform without failing.

From the foregoing, it will be observed that numerous variations and modifications may be effected without departing from the true spirit and scope of the novel concepts of the invention.

What is claimed is:

1. A method of cementing within a gas or oil well penetrating a subterranean formation, the method comprising the steps of:

pumping into the well a cementitious slurry comprising water and a cement mix, wherein the cement mix comprises:

TABLE II

| Ex. No. | Tensile Strength psi | Max Shear Stress psi | Young's Modulus, psi | Poison's Ratio | UCA Compressive Strength | | | | | | |
|---|---|---|---|---|---|---|---|---|---|---|---|
| | | | | | 50 psi | 500 psi | 8 hr. | 12 hr. | 24 hr. | 48 hr. | 72 hr. |
| Class H cement + 21.27% CSE-2 + 4% MPA-1 + 4% SMS + 2% R-21 + 4.255% LCA + 27.4 gps H$_2$O 181° F. Permeability to air, md: <0.001 | | | | | | | | | | | |
| 13 | 58 | 336 | 63,400 | 0.334 | 5:38:00 | n/a | 145 | 255 | 362 | 420 | 453 |
| Class H cement + 21.27% BA-90 + 4% MPA-1 + 3% SMS + 1% R-21 + 1.5% FL-52 + 0.3% ASA-301 + 5.3% LCM-1 + 31.1 gps H$_2$O 190° F. Permeability to air, md: <0.001 | | | | | | | | | | | |
| 14 | 58 | 303 | 78,700 | 0.391 | 4:21:00 | n/a | 265 | 315 | 376 | 397 | 402 |
| Class H cement + 21.27% CSE-2 + 4% MPA-1 + 4% SMS + 2% R-21 + 4.255% LCA + 0.7% FL-52 + 27.4 gps H$_2$O 181° F. Permeability to air, md: <0.001 | | | | | | | | | | | |
| 15 | 76 | 325 | 64,000 | 0.317 | 5:00:00 | n/a | 191 | 262 | 325 | 363 | 379 |
| Class H cement + 21.27% CSE-2 + 4% MPA-1 + 4% SMS + 2% R-21 + 4.255% LCA + 0.7% FL-52 + 27.4 gps H$_2$O 181° F. Permeability to air, md: <0.001 | | | | | | | | | | | |
| 16 | 52 | 381 | 64,600 | 0.385 | 7:37:30 | n/a | 57 | 151 | 298 | 365 | 399 |

(a) a hydraulically-active cementitious material;
(b) between from about 0.1 to about 8 weight percent, by weight of cementitious material (BWOC), of an alkali metasilicate and/or alkali silicate;
(c) between from about 2 to about 10 percent BWOC of calcined kaolin or metakaolin; and
(d) between from about 0.5 to about 55 percent BWOC of silica fume or micro silica quartz; and
allowing the cementitious slurry to set.

2. A method of cementing within a gas or oil well penetrating a subterranean formation, the method comprising the steps of:
pumping into the well a cementitious slurry comprising water and a cement mix, wherein the cement mix comprises:
(a) a Class H Portland cement;
(b) between from about 0.1 to about 8 weight percent, by weight of cementitious material (BWOC), of an alkali metasilicate and/or alkali silicate;
(c) between from about 2 to about 10 percent BWOC of calcined kaolin or metakaolin; and
(d) between from about 0.5 to about 55 percent BWOC of silica fume; and
allowing the cementitious slurry to set.

3. A method of cementing within a gas or oil well penetrating a subterranean formation, the method comprising the steps of:
pumping into the well a cementitious slurry comprising water and a cement mix, wherein the cement mix comprises:
(a) a Class C Portland cement;
(b) between from about 0.1 to about 8 weight percent, by weight of cementitious material (BWOC), of an alkali metasilicate and/or alkali silicate;
(c) between from about 2 to about 10 percent BWOC of calcined kaolin or metakaolin; and
(d) between from about 0.5 to about 55 percent BWOC of micro silica quartz; and
allowing the cementitious slurry to set.

4. The method of claim 2, wherein the density of the cementitious slurry is between from about 9.5 to about 11.5 ppg.

5. The method of claim 2, wherein the amount of mix water in the cementitious slurry is between from about 200 to about 560 percent BWOC.

6. The method of claim 3, wherein the density of the cementitious slurry is between from about 9.5 to about 11.5 ppg.

7. The method of claim 1, wherein the hydraulically-active cementitious material is Portland cement.

8. The method of claim 7, wherein the Portland cement is selected from the group consisting of API Class C and H cements.

9. The method of claim 1, wherein component (d) is silica fume.

10. The method of claim 1, wherein the alkali metasilicate and/or alkali silicate is selected from the group consisting of sodium metasilicate and sodium silicate.

11. The method of claim 10, wherein component (b) is sodium metasilicate.

12. The method of claim 11, wherein component (d) is silica fume.

13. The method of claim 1, wherein the cement mix further contains a set retarder.

14. The method of claim 1, wherein the cement mix further contains fly ash or pozzolan cement.

15. The method of claim 13, wherein the set retarder is sodium lignosulfonate.

16. The method of claim 1, wherein component (d) is micro silica quartz.

17. The method of claim 11, wherein component (d) is micro silica quartz.

18. The method of claim 16, wherein the cement mix further contains at least one component selected from the group consisting of aluminum oxide, iron oxide, calcium oxide and calcium sulfate.

19. The method of claim 2, wherein the cement mix further contains at least one component selected from the group consisting of a set retarder, crystalline silica, gypsum and a naturally occurring solid hydrocarbon.

20. The method of claim 19, wherein the set retarder is sodium lignosulfonate.

21. The method of claim 1, wherein the amount of silica fume or micro silica quartz in the cement mix is less than or equal to 55 percent BWOC.

22. The method of claim 1, wherein the density of the cementitious slurry is less than or equal to 11.5 pounds per gallon (ppg).

23. The method of claim 22, wherein the density of the cementitious slurry is between from about 9.5 to about 11.5 ppg.

24. The method of claim 1, wherein the amount of mix water in the cementitious slurry is between from about 200 to about 560 percent BWOC.

25. The method of claim 1, wherein the compressive strength of the cementitious slurry, when cured, is in excess of 100 psi after 24 hours at 130° F.

26. The method of claim 2, wherein the amount of mix water in the cementitious slurry is between from about 200 to about 560 percent BWOC.

27. The method of claim 25, wherein the compressive strength of the cementitious slurry, when cured, is in excess of 100 psi after 72 hours at 130° F.

28. The method of claim 1, wherein the cement mix further contains a lost circulation additive.

29. The method of claim 3, wherein the compressive strength of the cementitious slurry, when cured, is in excess of 100 psi after 24 hours at 130° F.

30. The method of claim 3, wherein the amount of mix water in the cementitious slurry is between from about 200 to about 560 percent BWOC.

31. The method of claim 3, wherein the cement mix further contains a set retarder.

* * * * *